(12) United States Patent
King

(10) Patent No.: US 6,382,516 B1
(45) Date of Patent: *May 7, 2002

(54) SECURITY SYSTEM INCLUDING A PORTABLE SECURE MEDIUM HAVING A MICROPHONE THEREIN

(75) Inventor: Reginald Alfred King, Shrivenham (GB)

(73) Assignee: Domain Dynamics Limited, Little Houghton (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,663

(22) PCT Filed: Aug. 20, 1997

(86) PCT No.: PCT/GB97/02228

§ 371 Date: Mar. 10, 1999

§ 102(e) Date: Mar. 10, 1999

(87) PCT Pub. No.: WO98/08188

PCT Pub. Date: Feb. 26, 1998

(30) Foreign Application Priority Data

Aug. 20, 1996 (GB) .............................. 9617426

(51) Int. Cl.[7] .............................. G06K 19/06
(52) U.S. Cl. ................. 235/492; 235/375; 235/493; 902/5; 902/21
(58) Field of Search ................. 235/492, 375, 235/380, 382, 382.5, 449, 457, 462.45, 462.25, 472.01, 493; 902/3, 4, 5, 21, 26, 27

(56) References Cited

U.S. PATENT DOCUMENTS

| 4,851,654 | A | * | 7/1989 | Nitta ........................... 235/492 |
| 5,146,435 | A | | 9/1992 | Bernstein ..................... 367/181 |
| 5,216,490 | A | | 6/1993 | Greiff et al. .............. 73/517 R |
| 5,452,268 | A | | 9/1995 | Bernstein ..................... 367/181 |
| 5,623,552 | A | * | 4/1997 | Lane ....................... 235/492 X |
| 6,015,093 | A | * | 1/2000 | Barrett et al. ................ 235/492 |
| 6,065,674 | A | * | 5/2000 | Shriver ........................ 235/380 |

FOREIGN PATENT DOCUMENTS

| DE | G9316734.2 | 10/1993 |
| EP | 0277276 | 8/1988 |
| WO | WO 97/45831 | 12/1997 |

OTHER PUBLICATIONS

Patent Abstracts of Japan vol. 013, No. 120 (P–846), Mar. 24 1989 & JP 63 292287 a (EIKO SHIODA), Nov. 29, 1988 see abstract.

* cited by examiner

Primary Examiner—Michael G. Lee
Assistant Examiner—Daniel St. Cyr
(74) Attorney, Agent, or Firm—Nixon & Vanderhye

(57) ABSTRACT

A security device and a security system incorporating such a device comprises a portable secure object which includes a unit for storing information, a unit for storing a voice biometric signal or a signal indicative thereof, and an integral microphone. The microphone generates the voice biometric signal during a registration procedure, and subsequently derives a further voice biometric signal for comparison with the generated voice biometric signal for subsequent interrogation purposes.

5 Claims, 1 Drawing Sheet

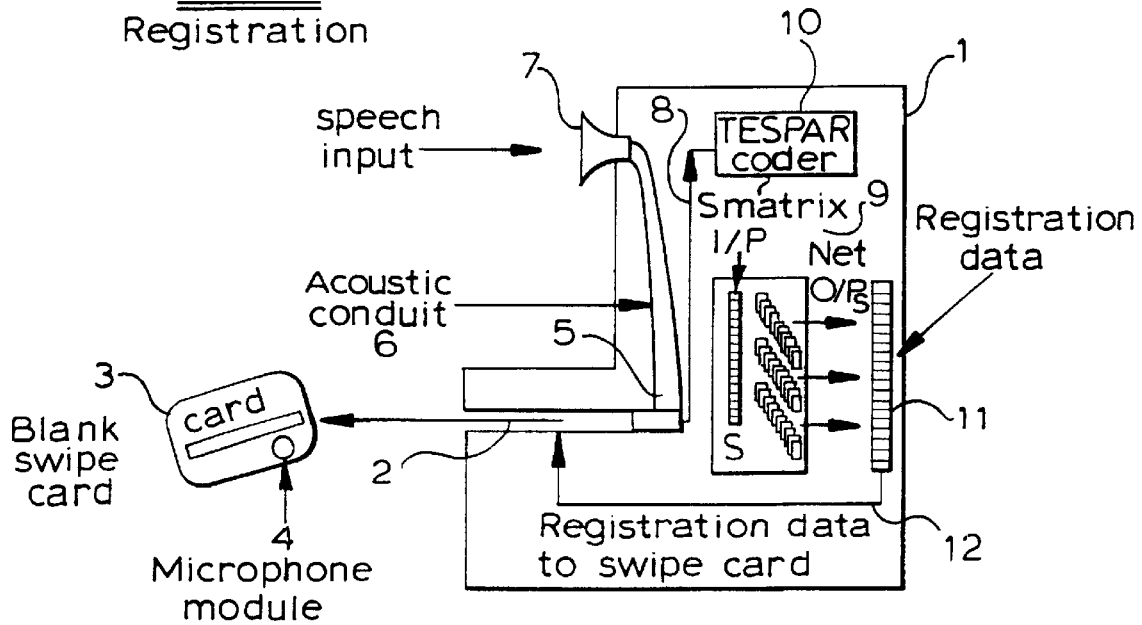
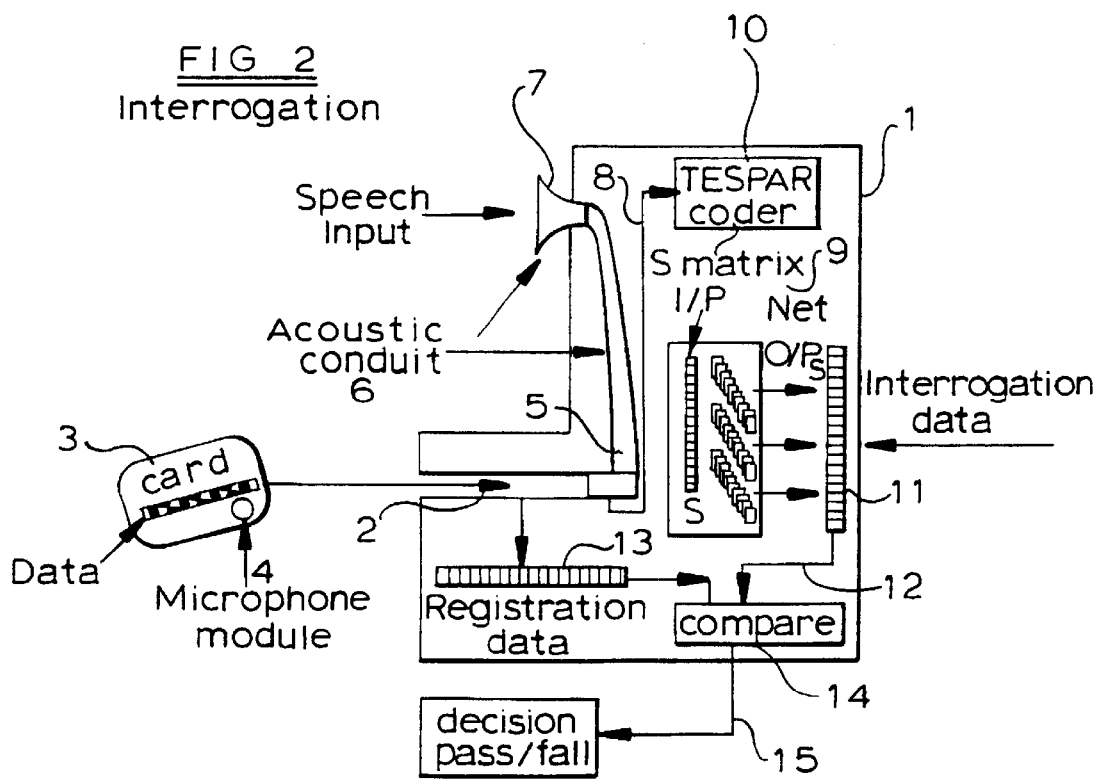

SECURITY SYSTEM INCLUDING A PORTABLE SECURE MEDIUM HAVING A MICROPHONE THEREIN

BACKGROUND OF THE INVENTION

This invention relates to security devices and to systems incorporating such devices, and is especially applicable to security devices in the form of portable secure objects and associated systems.

DESCRIPTION OF THE RELATED ART

The term portable secure object is well known and commonly used by those skilled in the art, to indicate a small portable object such as a credit card or smart card or a smart electronic key, which contains personal, commercial or other information in analog digital form which a user wishes to remain secure, usually from use or access by unauthorized persons.

This invention is particularly applicable to arrangements using smart cards such as are described in the co-pending International patent application No. PCT/GB97/01451 but may be applied to other systems using any card or other portable secure object containing information which needs to be accessed by means of an acoustic, electrical, electronic, mechanical or vibrational transducer.

In the arrangement described in patent application No. PCT/GB97/01451 an acoustic interface is provided to enable a person in possession of a smart card to input a voice signal as a biometric feature to a card reader machine into which the card has been inserted in order to confirm the identity of the speaker and thus permit access by the speaker to the information on the card or in the system to which the card is inserted or otherwise applied. In such systems the voice biometric data may be coded appropriately and stored on the card or in some centralized store for retrieval and comparison.

JP-A-63-292287 (Abstract) discloses a similar arrangement which records a voiceprint of a card owner and stores the coded voiceprint on a card, and for identifying the card owner during later use of the card, the system records a voiceprint of the user and makes a comparison with the voiceprint stored on the card.

It is has been found that a major problem in embodying and using such systems is that the characteristics of input microphones or other input transducers vary significantly, such that the sound patterns generated and stored during registration may not match the sound patterns produced by the individual during interrogation, even if the subject speaker spoke his or her input phrase in an identical fashion. Microphone and transducer variability therefore is a major adverse feature of such systems which prevents or precludes their widespread use.

SUMMARY OF THE INVENTION

It is an object of the present invention to provide an improved system whereby the problem related to microphone variability is substantially overcome.

According to the present invention there is provided a security system comprising in combination a portable secure object and a terminal for use with said object, said portable secure object including means for storing information, and means for storing a coded sound signal or a signal indicative thereof, microphone means being provided, and means responsive to said microphone means for generating said coded sound signal during a registration procedure, characterised in that said microphone means is formed integrally with said portable secure object, and in that an output derived from said microphone means is connected to said terminal, whereby said microphone means is subsequently used for deriving in said terminal a further coded sound signal for comparison with said generated coded sound signal for subsequent interrogation purposes.

The feature of embodying a microphone on a smart card is known from DE-U-9316734, but the same microphone is not used to deliver the generated sound signal to the system terminal.

In one arrangement for carrying out the invention it is arranged that said terminal comprises sound transmission means for transmitting a sound signal input to said terminal to the microphone means of said portable secure object, signal processing means responsive to an electrical signal from said microphone means for generating a coded signal indicative of said sound signal, and means for applying a signal to said portable secure object corresponding to said coded signal.

In another arrangement for carrying out the invention it is arranged that said terminal comprises sound transmission means for transmitting a sound signal input to said terminal to the microphone means of said portable secure object, signal processing means responsive to an electrical signal from said microphone means for generating a coded signal indicative of said sound signal, means responsive to a signal stored in said portable secure object for generating a coded sound signal, comparison means for comparing the generated coded sound signal with the coded sound signal generated by said processing means and for permitting access to the confidential information stored on said portable security device in dependence upon the correspondence therebetween.

In a preferred system said signal processing means comprises a plurality N of signal comparators, each signal comparator being adapted to compare the electrical signal from said microphone means with a plurality of different exemplar signals and for affording an output indicative of which of said exemplar signals corresponds most closely to said electrical signal, the sets of exemplar signals of each of said signal comparators being different, said electrical signal being input to each of said signal comparators to derive an N-part coded signal which is indicative of said sound signal. Advantageously each of said signal comparators will be based on time encoded signal processing and recognition (TESPAR) coding.

In carrying out the invention it may be arranged that said coded sound signal is stored in said portable secure object or alternatively is stored remotely from said portable secure object.

Preferably, the said portable secure object takes the form of a magnetic stripe swipe card, an electronic smart card, or a plastic card having bar coded information thereon.

BRIEF DESCRIPTION OF THE DRAWINGS

An exemplary embodiment of the invention will now be described, reference being made to the accompanying drawings, in which:

FIG. 1 is a schematic circuit diagram of a security device in accordance with the present invention in the form of a card reader terminal adapted for registration purposes for use in conjunction with a portable secure object in accordance with the present invention in the form of a magnetic stripe swipe card; and FIG. 2 is a schematic diagram of the security device of FIG. 1, adapted for Interrogation purposes.

DESCRIPTION OF PREFERRED EMBODIMENTS

In FIG. 1 of the drawings there is depicted a card reader terminal 1 which is closely based on the arrangement disclosed in FIG. 7 of the aforesaid International patent application No. PCT/GB97/001451 and which includes signal processing which is described in great detail in that application.

The card reader terminal 1 of FIG. 1 differs from that disclosed in FIG. 7 of the aforesaid International application in that the need for the microphone which forms an integral part of the card reader terminal of FIG. 7 is obviated by fabricating a microphone actually on the swipe card as will be explained.

The card reader terminal 1 comprises a card receiving slot 2 into which a magnetic stripe swipe card 3 can be inserted by a user. The swipe card 3, as has been explained, is provided with an integrally formed microphone module 4 which, when the card is located in the slot 2 of the card reader terminal 1 locates adjacent the lower end 5 of an acoustic conduit 6 which extends upwards and terminates on the side face of the terminal 1 at a speech input cone 7. The slot 2 of the card reader terminal 1 is also provided with means (not shown) for making an electrical connection to the card 3 when it is located in the slot 2 so that the electrical output from the microphone module 4 may be fed via connection 8 to signal processing circuitry 9 including a TESPAR coder 10 as described in detail in the aforesaid International application, and which results in registration data corresponding to a coded sound signal being stored in a digital output store 11 which forms part of the signal processing circuitry 9. The registration data corresponding to the coded sound signal stored in the digital output store 11 is fed via output 12 and is read into the magnetic stripe of the swipe card 3.

The operation of the security system of FIG. 1 is as follows:

When a user wishes to register, a blank magnetic swipe card 3 is issued to him and is inserted in the slot 2 of the card reader terminal 1. The terminal 1 will then prompt the user to speak into the speech input cone 7. The speech input is then fed via the acoustic conduit 6 to the microphone module 4 on the swipe card 3, and the electrical output from it is fed to the signal processing circuitry 9 in the terminal 1 which generates the registration data in the form of the coded sound signal which is stored in the digital output store 11 and which is read into the magnetic stripe of the swipe card 3.

In FIG. 2 of the drawings there is depicted the card reader terminal 1 of FIG. 1 adapted for card Interrogation purposes and is closely based on the arrangement disclosed in FIG. 6 of the aforesaid International application.

For Interrogation purposes, a user having in his possession a swipe card 3 having Registration data contained in the magnetic stripe thereof along with confidential data relating to the user, inserts the card 3 in the slot 2 of the card reader terminal 1 and the registration data stored on the card 3 is read into a Registration data store 13. The terminal 1 then prompts the user to speak into the speech input cone 7 of the terminal 1. The speech input is then processed as, has been described with reference to FIG. 1 and results in interrogation data being stored in the digital output store 11. The interrogation data in the digital output store 11 is compared in a comparator 14 with the Registration data stored in the Registration data store 13 and a pass/fail output 15 is afforded.

A "pass" output is afforded if the comparison between the interrogation data and the registration data indicates a close match and enables the user to complete his transaction including providing access to the confidential information contained on his swipe card 3.

A "fail" output is afforded if the comparison between the interrogation data and the registration data indicates that there is not a close match and prevents any transaction involving the swipe card 3 from proceeding.

As will be appreciated from the security system described with reference to FIGS. 1 and 2 of the accompanying drawings, the microphone module 4 fabricated on the swipe card 3 is used for both registration and all interrogation purposes and accordingly overcomes the problems associated with using different microphones.

It will be appreciated that the microphone module 4 may take any convenient form and may be a simple piezo-electric thin film transducer which may form all or part of the substrate of the card. Alternatively, a silicon micromachined microphone such as that marketed by Noise Cancellation Technologies, Inc., of the U.S., fabricated integrally with a smart card microprocessor chip, or other forms of microphone such as those disclosed in U.S. Pat. Nos. 5,146,435, 5,216,490 and 5,452,268 may be used.

It should be appreciated that the arrangements which have been described have been given by way of example only and it will be apparent to those skilled in the art that various modifications may be made without departing from the scope of the invention. For example, the acoustic conduit may take any convenient form and may be air filled or may comprise any appropriate vibration conducting material such as metal, fluid, liquid, gas, etc, or even foam. Also, instead of storing the Registration data in the form of a coded sound signal on the swipe card 3, it may be stored remotely e.g. at the terminal 1 or centrally and a coded signal corresponding to the coded sound signal may be stored on the card 3.

What is claimed is:

1. A security system comprising:
a portable secure object; and
a terminal for use with said portable secure object,
said portable secure object including:
    means for storing information, and
    means for storing a coded sound signal or a signal indicative thereof,
microphone means,
    means responsive to said microphone means for generating said coded sound signal during a registration procedure,
wherein said microphone means is formed integrally with said portable secure object,
wherein during use an output derived from said microphone means is subsequently used for deriving in said terminal a further coded sound signal for comparison with said generated coded signal for subsequent coded sound interrogation purposes,
wherein said terminal comprises:
    sound transmission means for transmitting a sound signal input to said terminal to the microphone means of said portable secure object,
    signal processing means responsive to an electrical signal from said microphone means for generating a coded signal indicative of said sound signal, and
    means for applying a signal to said portable secure object corresponding to said coded signal, and
wherein said signal processing means comprises a plurality N of signal comparators, each signal comparator being adapted to compare the electrical signal from said microphone means with a plurality of different exemplar signals and for affording an output indicative of which of said exemplar signals corresponds most closely to said electrical signal, the sets of exemplar signals of each of said signal comparators being different, said electrical signal being input to each of said signal comparators to derive an N-part coded signal which is indicative of said sound signal.

2. The system as claimed in claim 1, in which each of said signal comparators is based on time encoded signal processing and recognition (TESPAR) coding.

3. A security system in which a signal generated by a microphone in response to a user's speech is compared against a stored voice biometric signal for said user, read from a storage, so as to confirm the identity of said user, said system comprising:

a portable secure object having a confidential information storage; and a terminal arranged to receive said portable object during a registration procedure and a subsequent interrogation procedure, said terminal including a comparator for comparing voice biometric signals;

wherein said microphone is integral with said portable secure object, and said microphone is used both during said registration procedure, when a first voice biometric signal is stored, and during said subsequent interrogation procedure, when a further voice biometric signal is generated and compared by said comparator with said first voice biometric signal; and wherein said terminal includes a processor configured to generate said further voice biometric signal in response to signals generated by said microphone, said processor comprising a plurality N of signal comparators, each signal comparator being adapted to compare the electrical signal from said microphone with a plurality of different exemplar signals and for affording an output indicative of which of said exemplar signals corresponds most closely to said electrical signal, the sets of exemplar signals of each of said signal comparators being different, said electrical signal being input to each of said signal comparators to derive an N-part coded signal which is indicative of said sound signal.

4. A system as claimed in claim 3 in which each of said signal comparators is based on time encoded signal processing and recognition (TESPAR) coding.

5. A security system in which a signal generated by a microphone in response to a user's speech is compared against a stored voice biometric signal for said user, read from a voice biometric storage, so as to confirm the identity of said user, said system comprising:

a portable secure object having a confidential information storage and a microphone; and a terminal including:

electrical contacts arranged to receive electrical signals from said microphone on said portable secure object;

processor configured to generate voice biometric signals in response to electrical signals received from said microphone; and a comparator for comparing voice biometric signals, wherein said microphone is used both during a registration procedure, when a first voice biometric signal is stored, and during a subsequent interrogation procedure, when a further voice biometric signal is generated and compared by said comparator with said first voice biometric signal; and wherein said terminal includes a processor configured to generate said further voice biometric signal in response to signals generated by said microphone, said processor comprising a plurality N of signal comparators, each signal comparator being adapted to compare the electrical signal from said microphone with a plurality of different exemplar signals and for affording an output indicative of which of said exemplar signals corresponds most closely to said electrical signal, the sets of exemplar signals of each of said signal comparators being different, said electrical signal being input to each of said signal comparators to derive an N-part coded signal which is indicative of said sound signal.

\* \* \* \* \*